United States Patent
Ishida et al.

(10) Patent No.: US 10,172,039 B2
(45) Date of Patent: Jan. 1, 2019

(54) NODE, MASTER DEVICE, AND COMMUNICATION CONTROL SYSTEM, METHOD, AND PROGRAM

(71) Applicant: NEC Corporation, Tokyo (JP)

(72) Inventors: Tomonori Ishida, Tokyo (JP); Hiroshi Nakaishi, Tokyo (JP)

(73) Assignee: NEC Corporation, Tokyo (JP)

( * ) Notice: Subject to any disclaimer, the term of this patent is extended or adjusted under 35 U.S.C. 154(b) by 80 days.

(21) Appl. No.: 15/309,086

(22) PCT Filed: May 1, 2015

(86) PCT No.: PCT/JP2015/002308
§ 371 (c)(1),
(2) Date: Nov. 4, 2016

(87) PCT Pub. No.: WO2015/170471
PCT Pub. Date: Nov. 12, 2015

(65) Prior Publication Data
US 2017/0064582 A1 Mar. 2, 2017

(30) Foreign Application Priority Data
May 7, 2014 (JP) .................................. 2014-095961

(51) Int. Cl.
*H04L 12/28* (2006.01)
*H04L 12/403* (2006.01)
(Continued)

(52) U.S. Cl.
CPC .............. *H04W 28/10* (2013.01); *G01D 4/00* (2013.01); *H04L 12/28* (2013.01); *H04L 12/403* (2013.01);
(Continued)

(58) Field of Classification Search
CPC . H04W 28/10; H04W 72/0453; H04W 72/10; H04W 72/1247; H04W 28/16; H04W 84/18
(Continued)

(56) References Cited

U.S. PATENT DOCUMENTS

| 6,226,277 B1 * | 5/2001 | Chuah ..................... H04L 43/00 370/328 |
| 2001/0031634 A1* | 10/2001 | Mizutani ............... H04W 72/10 455/425 |

(Continued)

FOREIGN PATENT DOCUMENTS

| JP | 10-66140 | 3/1998 |
| JP | 2002-165248 | 6/2002 |

(Continued)

OTHER PUBLICATIONS

International Search Report and Written Opinion of ISA dated Jul. 28, 2015 in corresponding PCT International Application.

*Primary Examiner* — Phong La
(74) *Attorney, Agent, or Firm* — Finnegan, Henderson, Farabow, Garrett & Dunner, L.L.P.

(57) ABSTRACT

A node is included in a communication control system including a plurality of nodes 31, and a master device 30 for performing flow control of multihop communication in a network including the plurality of nodes 31. To the node 31 in use of second service, a time obtained by subtracting, from a frame period of the network, a total one frame transmission time of each node, used for first service is allocated as one frame transmission time used for second service having a priority set lower than that of the first service.

11 Claims, 6 Drawing Sheets

(51) Int. Cl.

| | |
|---|---|
| *H04L 12/44* | (2006.01) |
| *H04W 28/10* | (2009.01) |
| *H04W 72/10* | (2009.01) |
| *H04W 84/18* | (2009.01) |
| *H04W 72/04* | (2009.01) |
| *H04W 72/12* | (2009.01) |
| *G01D 4/00* | (2006.01) |
| *H04W 28/16* | (2009.01) |

(52) U.S. Cl.
CPC ......... *H04L 12/44* (2013.01); *H04W 72/0453* (2013.01); *H04W 72/10* (2013.01); *H04W 72/1247* (2013.01); *H04W 84/18* (2013.01); *H04W 28/16* (2013.01)

(58) Field of Classification Search
USPC .......................................................... 370/325
See application file for complete search history.

(56) References Cited

U.S. PATENT DOCUMENTS

| | | | | |
|---|---|---|---|---|
| 2001/0038628 | A1* | 11/2001 | Ofek | H04J 3/0697 370/392 |
| 2002/0080816 | A1* | 6/2002 | Spinar | H04W 28/20 370/449 |
| 2002/0123314 | A1* | 9/2002 | Kitazawa | H04L 47/10 455/134 |
| 2003/0095562 | A1* | 5/2003 | Liu | H04L 47/10 370/442 |
| 2004/0121786 | A1* | 6/2004 | Radcliffe | G01V 1/003 455/500 |
| 2005/0078672 | A1* | 4/2005 | Caliskan | H04L 45/42 370/389 |
| 2008/0274729 | A1* | 11/2008 | Kim | H04W 28/24 455/423 |
| 2009/0252102 | A1* | 10/2009 | Seidel | H04W 84/18 370/329 |
| 2010/0202416 | A1* | 8/2010 | Wilhelmsson | H04W 72/1215 370/336 |
| 2011/0255435 | A1 | 10/2011 | Niki | |
| 2011/0299421 | A1* | 12/2011 | Werb | G01D 4/004 370/252 |
| 2012/0316689 | A1* | 12/2012 | Boardman | H02J 13/0079 700/292 |
| 2012/0324273 | A1* | 12/2012 | Shaffer | H04L 45/02 714/4.12 |
| 2013/0027219 | A1* | 1/2013 | Myoung | H04Q 9/00 340/870.03 |
| 2013/0070734 | A1* | 3/2013 | Hwang | H04W 74/002 370/336 |
| 2013/0227290 | A1* | 8/2013 | Yoneyama | H04L 63/061 713/169 |
| 2013/0235732 | A1* | 9/2013 | Nema | H04W 84/18 370/241 |
| 2013/0272293 | A1* | 10/2013 | Nguyen | H04W 74/02 370/347 |
| 2014/0078931 | A1* | 3/2014 | Serizawa | H04W 52/0219 370/254 |
| 2015/0212138 | A1* | 7/2015 | Tsuchiya | G01R 31/08 702/58 |

FOREIGN PATENT DOCUMENTS

| | | |
|---|---|---|
| JP | 2004-363702 | 12/2004 |
| JP | 2006-287463 | 10/2006 |
| JP | 2008-206102 | 9/2008 |
| JP | 2009-152755 | 7/2009 |
| JP | 2010-147991 | 7/2010 |
| JP | 2013-172227 | 9/2013 |
| WO | WO 2008/108169 A1 | 9/2008 |
| WO | WO 2013/062101 A1 | 5/2013 |

* cited by examiner

NODE, MASTER DEVICE, AND COMMUNICATION CONTROL SYSTEM, METHOD, AND PROGRAM

CROSS-REFERENCE TO RELATED PATENT APPLICATIONS

This application is a National Stage Entry of International Application No. PCT/JP2015/002308, filed May 1, 2015, which claims priority from Japanese Patent Application No. 2014-095961, filed May 7, 2014. The entire contents of the above-referenced applications are expressly incorporated herein by reference.

TECHNICAL FIELD

The present invention relates to a node, a master device, and a communication control system, a method, and a program which are used for multihop communication.

BACKGROUND ART

For example, in many cases, a main object of multihop communication is to provide single service such as advanced metering infrastructure (AMI) service. However, when a communication system such as long term evolution (LTE) is used for band extension, a communication control system using multihop communication is expected to be used for additional service (video distribution, Internet browsing, or the like). At that time, a technique is required which allows effective and fair use of unoccupied band while accurately securing a band for the AMI service as the main object.

For example, a communication control system including a master communication terminal and slave communication terminals are described in PTL 1. In PTL 1, the master communication terminal includes a contention management table registering communication-terminal transmission order, and receives participation requests from the slave communication terminals for participation of the slave communication terminals in a network.

Furthermore, PTL 2 describes that wireless communication devices constituting a wireless ad-hoc network recognize participation of a new node in the ad-hoc network. PTL2 also describes that nodes each measure a usage condition of a radio band in a communication range, change a beacon transmission interval when the radio band usage rate is not less than a certain value, and inhibit increase in band used for wireless communication or packet collision rate, caused by beacon.

A system including a premises communication adapter and a wide area communication adapter connected to the premises communication adapter is described in PTL 3. PTL 3 also describes that the wide area communication adapter uses a wireless LAN communication function to transmit and receive signals to and from a gas management server provided in a data center or the like of a gas company. Furthermore, PTL 3 describes that, for communication between premises communication adapters, multistage relay transmission is performed, which is known as multihop transmission.

CITATION LIST

Patent Literature

PTL 1: Japanese Patent Application Laid-Open No. 2004-363702 (paragraph 0012)

PTL 2: Japanese Patent Application Laid-Open No. 2006-287463 (paragraphs 0032, 0036)

PTL 3: International Unexamined Patent Application No. 2013/062101 (paragraphs 0222, 0227, 0235)

SUMMARY OF INVENTION

Technical Problem

However, in the communication control systems described in PTLS 1 to 3, when a large number of nodes transmit participation requests to a master terminal, enough communication band sometimes cannot be secured. For example, PTL 2 describes the inhibition of increase in band used for wireless communication or packet collision rate, caused by beacon is described, but does not describe securing a communication band for packet communication used for service. Further, when a plurality of services is provided to the slave communication terminals, band allocation is not performed according to the services. Accordingly, for example, the slave terminals may use low-priority additional service to transmit high-priority data such as electric meter reading in the AMI service, and cause insufficient communication band.

Therefore, an object of the present invention is to provide a node, a master device, and a communication control system, method, and program with which a band for communication of high-priority data transmitted from a node participating in a multihop communication network is preferentially secured.

Solution to Problem

A node according to the present invention is included in a communication control system which comprises a plurality of nodes and a master device for performing flow control of multihop communication in a network including the nodes. A time obtained by subtracting, from a frame period of the network, a total one frame transmission time of each node, used for first service, is allocated to the node in use of the second service as a one frame transmission time used for second service having a priority set lower than that of the first service.

A master device according to the present invention is a master device performing flow control of multihop communication in a network including a plurality of nodes, and the master device allocates, to respective nodes using the second service, a time obtained by subtracting, from a frame period of the network, a total one frame transmission time of each node, used for first service, as a one frame transmission time used for second service having a priority set lower than that of the first service.

A communication control system according to the present invention includes a plurality of nodes, and a master device for performing flow control of multihop communication in a network including the nodes, and the master device allocates, to each node using second service, a time obtained by subtracting, from a frame period of the network, a total one frame transmission time of each node, used for first service, as a one frame transmission time used for second service having a priority set lower than that of the first service.

A communication control method according to the present invention is a communication control method used for a plurality of nodes, and a master device for performing flow control of multihop communication in a network including the nodes, and the master device allocates, to respective nodes using the second service, a time obtained by subtracting, from a frame period of the network, a total one frame transmission time of each node, used for first service, as a one frame transmission time used for second service having a priority set lower than that of the first service.

A communication control program according to the present invention is a communication control program installed in a computer for performing flow control of multihop communication in a network including a plurality of nodes, and the communication control program causes the computer to allocate, to each node using second service, a time obtained by subtracting, from a frame period of the network, a total one frame transmission time of each node, used for first service, as a one frame transmission time used for second service having a priority set lower than that of the first service.

Advantageous Effects of Invention

According to the present invention, a band for communication of high-priority data transmitted from a node participating in a multihop communication network is preferentially secured.

DESCRIPTION OF EMBODIMENT

Exemplary Embodiment 1

Figure 1:
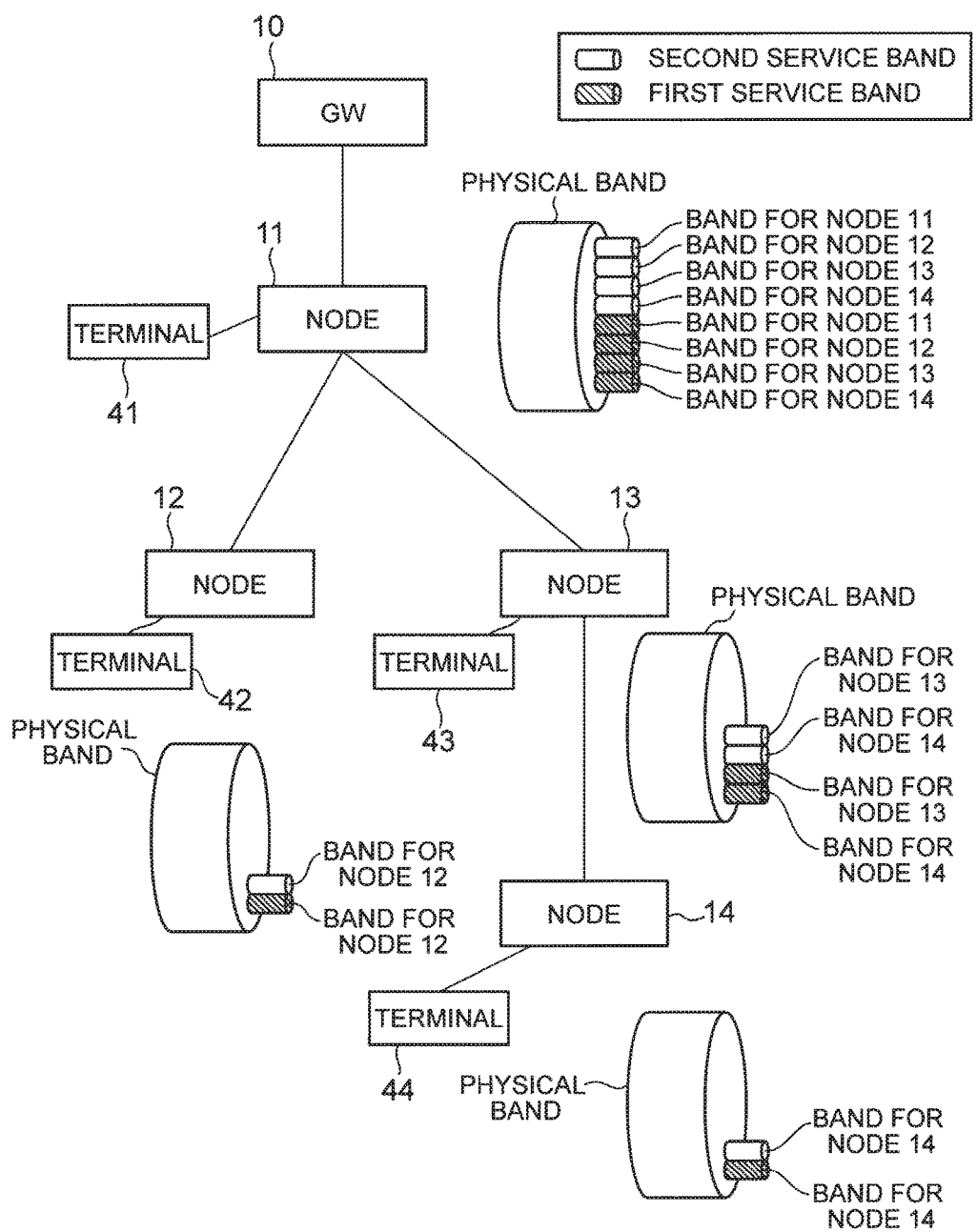
FIG. 1 It depicts an explanatory diagram illustrating a configuration of a communication control system according to a first exemplary embodiment.

A first exemplary embodiment (exemplary embodiment 1) according to the present invention will be described below with reference to the drawings. FIG. 1 is an explanatory diagram illustrating a configuration of a communication control system according to the present exemplary embodiment. As illustrated in FIG. 1, the communication control system according to the present exemplary embodiment includes a gateway (GW) 10, and nodes 11 to 14 controlled by the GW 10. Note that, the GW 10 corresponds to a master device in the present invention. Furthermore, terminals 41 to 44 are wired or wirelessly connected to the nodes 11 to 14, respectively. In the communication control system illustrated in FIG. 1, the GW 10 is allowed to communicate only with the node 11, but the GW 10 may be allowed to communicate with at least two nodes. Furthermore, in FIG. 1, the communication control system has a tree network topology, but for example may have a mesh network topology. Furthermore, four nodes and four terminals are exemplified in FIG. 1, but the number of nodes and terminals is not particularly limited. For communication among the nodes 11 to 14, multihop communication is used.

Functions of the GW 10 and the nodes 11 to 14 are for example achieved by hardware designed to perform specific calculation processing or the like, or an information processing device such as a central processing unit (CPU) operated according to a program. Furthermore, the program is stored in a non-transitory computer-readable storage medium.

The GW 10 controls multihop communication of a network including the nodes 11 to 14. The GW 10 is for example a commonly-used gateway device for connecting a network to another network having a different protocol. The GW 10 holds a management table in which nodes participating in a network and usage of the second service by the nodes are recorded. The GW 10 holds a management table shown in table 1 as a management table corresponding to the network topology illustrated in FIG. 1.

TABLE 1

| Network participating node | Usage of second service |
|---|---|
| Node 11 | Use |
| Node 12 | Use |
| Node 13 | Use |
| Node 14 | Use |

Furthermore, the GW 10 may hold a management table of nodes participating in a network, including upper nodes thereof, as shown in the following table 2. The GW 10 for example selects a radio wave having a maximum electric field strength, from radio waves received by each node, and defines a node emitting the radio wave having a maximum electric field strength as an upper node of each node. The GW 10 uses the management table to perform dynamic flow control for each node. For example, when movement of a node causes change in electric field strength, the GW 10 changes an upper node in the management table according to the change in electric field strength, and transmits an instruction for changing the upper node, to the moved node.

TABLE 2

| Network participating node | Usage of second service | Upper node |
|---|---|---|
| Node 11 | Use | GW |
| Node 12 | Use | Node 11 |
| Node 13 | Use | Node 11 |
| Node 14 | Use | Node 13 |

Furthermore, the GW 10 stores bandwidth used for first service (first service bandwidth) and bandwidth used for second service (second service bandwidth) allocated to each of the nodes participating in the network. In addition, the GW 10 stores available bandwidth (physical bandwidth) in the network. In an example illustrated in FIG. 1, packets transmitted from all nodes pass through the node 11, so that the maximum bandwidth of the node 11 represents available physical bandwidth in the network. Note that, when time-division multiplex communication is performed, in a communication control network according to the present exemplary embodiment, "bandwidth" or "band" in description of the present exemplary embodiment can be replaced with "transmission time".

The first service is high-priority service such as AMI service. In the AMI service, for example communication of electric, gas, or water meter reading is performed. Alternatively, the first service may be for example service used by a vehicle-mounted information terminal. In this configuration, downlink information is traffic jam information, and uplink information is positional information, in the first service. Furthermore, the first service bandwidth is predetermined fixed bandwidth, including a band for multihop construction and a band for controlling quality of service (QoS). That is, a first service band is expressed by the following formula (1).

Fixed band(first service band)=band for meter reading transmission+band for multihop construction+band for controlling QoS  (1)

The second service is service having priority lower than that of the first service, including additional service such as video or music distribution or Internet browsing. The second service bandwidth is equal to or larger than guaranteed service bandwidth specified in a contract. In the present exemplary embodiment, all nodes have equal guaranteed service bandwidth, but the guaranteed service bandwidth may differ depending on contracts. Alternatively, when a node user does not make a contract for the second service, the corresponding node may have a second service bandwidth of 0.

The nodes 11 to 14 are communication devices capable of performing multihop wireless communication. The nodes 11 to 14 are for example wireless local area network (LAN) routers or information collection devices for home energy management system (HEMS). In an example illustrated in FIG. 1, the node 11 is arranged at a position where the node 11 can wirelessly communicates with the GW 10, the node 12, and the node 13. The node 13 is arranged at a position where the node 13 can wirelessly communicates with the node 14.

Furthermore, when the first service is the AMI service, the nodes 11 to 14 are for example smart meters, and the GW 10 is for example a concentrator. In this case, the nodes 11 to 14 transmit data (e.g., electric meter reading) to the GW 10 at predetermined time intervals. The GW 10 collects the data from the nodes 11 to 14, and transmits the data to a meter data management system (MDMS).

The terminals 41 to 44 are terminals used for receiving provision of the second service, such as personal computers (PC) or mobile terminals. The terminals 41 to 44 can communicate with the nodes connected thereto. For example, the terminals 41 can communicate with the node 11. The terminals 42 to 44 are also configured as described above. For communication between the nodes and the terminals, any communication system may be used, and any of wired and wireless communication may be employed.

Next, allocation of a transmission time to each service will be described, on condition that time-division multiplex communication is used in the network. The GW 10 subtracts, from a frame period, a total one frame transmission time (hereinafter, referred to as first service transmission time) allocated to respective nodes and used for the first service. Then, the GW allocates the obtained time to the nodes, as one frame transmission time used for second service (hereinafter, referred to as second service transmission time). A time allocated to second service is at least not less than a predetermined guaranteed transmission time, and is fairly allocated to respective nodes. Alternatively, the GW 10 may determine a time allocated to second service according to a contract previously determined for each node and allocate different times to respective nodes.

Furthermore, the GW 10 determines whether to allow participation of a node requesting participation in the network anew, based on the frame period in the network, the first service transmission time, and a guaranteed one frame transmission time used for the second service (hereinafter, referred to as guaranteed second service transmission time).

Specifically, the GW 10 determines whether to allow participation of the node in the network by control called call admission control (CAC). When all nodes have an equal first service transmission time and an equal guaranteed second service transmission time, the maximum participating number of nodes allowed to participate in the network is determined by the following formula (2).

Maximum participating number of nodes=frame period÷(first service transmission time per node+guaranteed second service transmission time per node)  (2)

Furthermore, when respective nodes have different first service transmission times and different guaranteed second service transmission times, the GW 10 confirms whether a new node participating in the network satisfies the following formula (3). Upon participation of the new node satisfying the formula (3), the GW 10 allows participation of the new node, and upon participation of the new node not satisfying the formula (3), the GW 10 refuses participation of the new node.

Frame period>Σ(first service transmission time per node)+Σ(guaranteed second service transmission time per node)  (3)

The communication control system according to the present exemplary embodiment preferentially allocates a band to service having high importance, in a network in which multihop communication is performed, and thus insufficient communication band (transmission time) for transmitting high-priority data can be prevented. In particular, nodes are often moved in a multihop communication network, but, according to the communication control system of the present exemplary embodiment, participation of a new node in a network does not interrupt communication of already participating nodes. Furthermore, the communication control system according to the present exemplary embodiment secures a predetermined guaranteed band also for the low-priority service, and service outage can be avoided.

Figure 2:
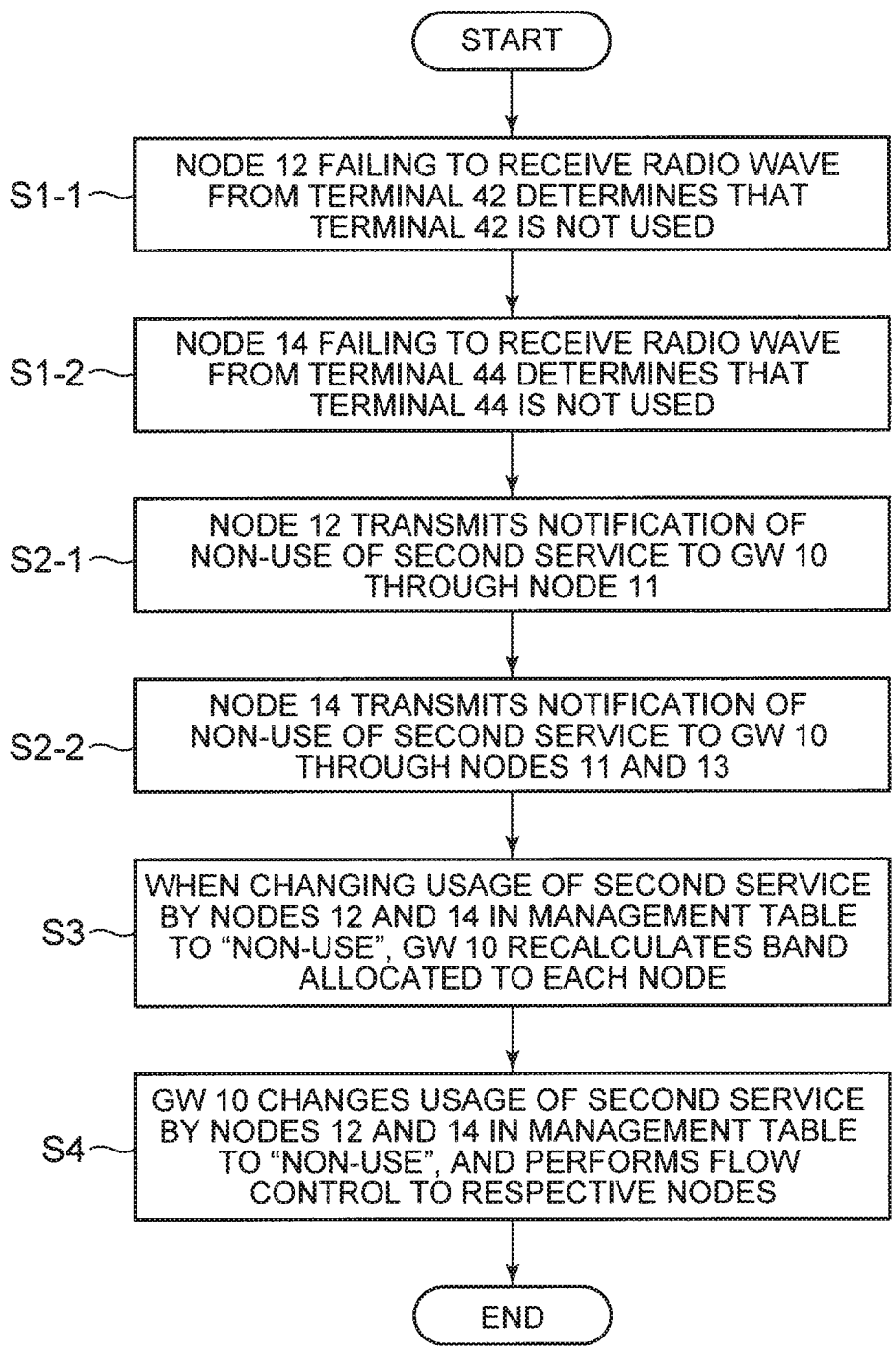
FIG. 2 It depicts a flowchart illustrating operation which is performed when some of terminals cannot be used.
Figure 3:
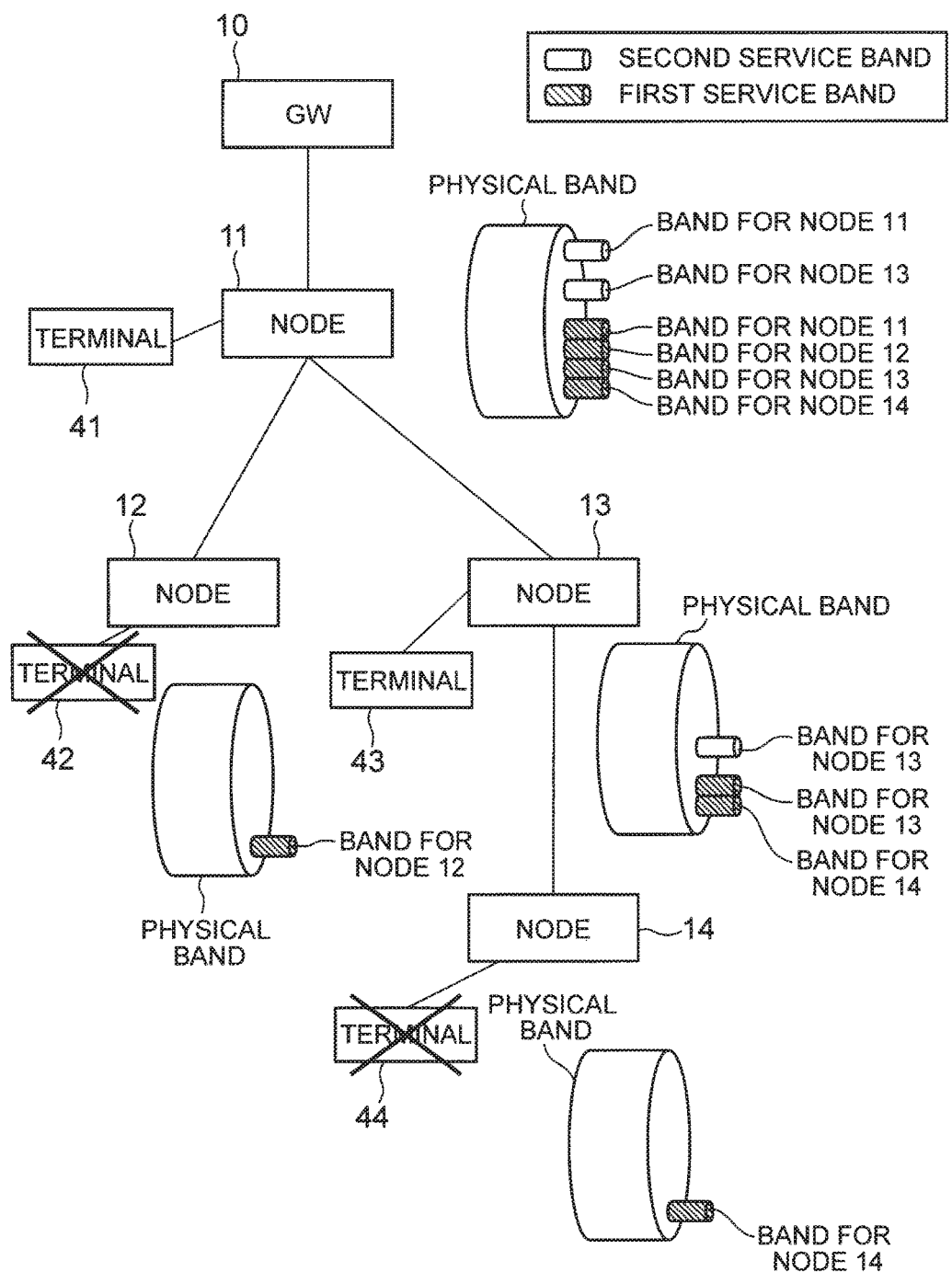
FIG. 3 It depicts an explanatory diagram illustrating a state of a network in which the some of the terminals cannot be used.

Next, description will be made of control which is performed when the second service is not used in the communication control system according to the present exemplary embodiment. FIG. 2 is a flowchart illustrating operation which is performed when some of the terminals cannot be used. FIG. 3 is an explanatory diagram illustrating a state of a network in which the some of the terminals cannot be used.

Respective nodes periodically confirm connection of lower terminals. The node 12 failing to receive a radio wave from the terminal 42 determines that the terminal 42 is not used (step S1-1). The node 14 failing to receive a radio wave from the terminal 44 determines that the terminal 44 is not used (step S1-2). Failure in reception of radio wave between a node and a terminal is caused by for example failure in wireless communication between the node and the terminal which is caused by turning off of the terminal, device failure, or movement of the terminal. Note that, the order of steps S1-1 and S1-2 may be reversed.

Failure in reception of a radio wave from a terminal, that is, non-use of the terminal represents non-use of the second service. Therefore, the node 12 transmits notification of non-use of the second service to the GW 10 through the node 11 (step S2-1). The node 14 transmits notification of non-use of the second service to the GW 10 through the nodes 11 and 13 (step S2-2). For example, when all of a plurality of terminals connected to a node are not used, the node transmits notification of non-use of the second service, to the GW 10.

Next, the GW 10 recalculates a band allocated to each node, where the usage of the second service by the nodes 12 and 14 in the management table is changed to "NON-USE" (step S3). Then, the GW 10 changes the usage of the second service by the nodes 12 and 14 in the management table to "NON-USE", and performs flow control to respective nodes (step S4). Note that, after the usage of the second service by the nodes 12 and 14 in the management table is changed to "NON-USE", the GW 10 may recalculate the band based on the changed management table. Specifically, the GW 10 changes, to "NON-USE", the usage of the second service by the nodes 12 and 14 in the management table shown in Table 1 to hold a management table illustrated in Table 3.

TABLE 3

| Network participating node | Usage of second service |
| --- | --- |
| Node 11 | Use |
| Node 12 | Non-use |
| Node 13 | Use |
| Node 14 | Non-use |

The flow control in step S4 will be particularly described. Since the first service band is the fixed band, the GW 10 allocates, to the nodes 11 to 14, bandwidth equal to that before the terminals 42 and 44 cannot be used, as the first service band.

Furthermore, when the time-division multiplex communication is performed in the network, the GW 10 allocates a transmission time used for second service, according to the usage of the second service. Specifically, the GW 10 calculates a second service transmission time using the following formula (4) for the nodes (nodes 11 and 13) using the second service. The participating number of nodes represents the number of nodes included in the management table.

Second service transmission time=(frame period−first service transmission time×participating number of nodes)÷participating number of nodes where usage of the second service indicates "USE"  (4)

Figure 4:
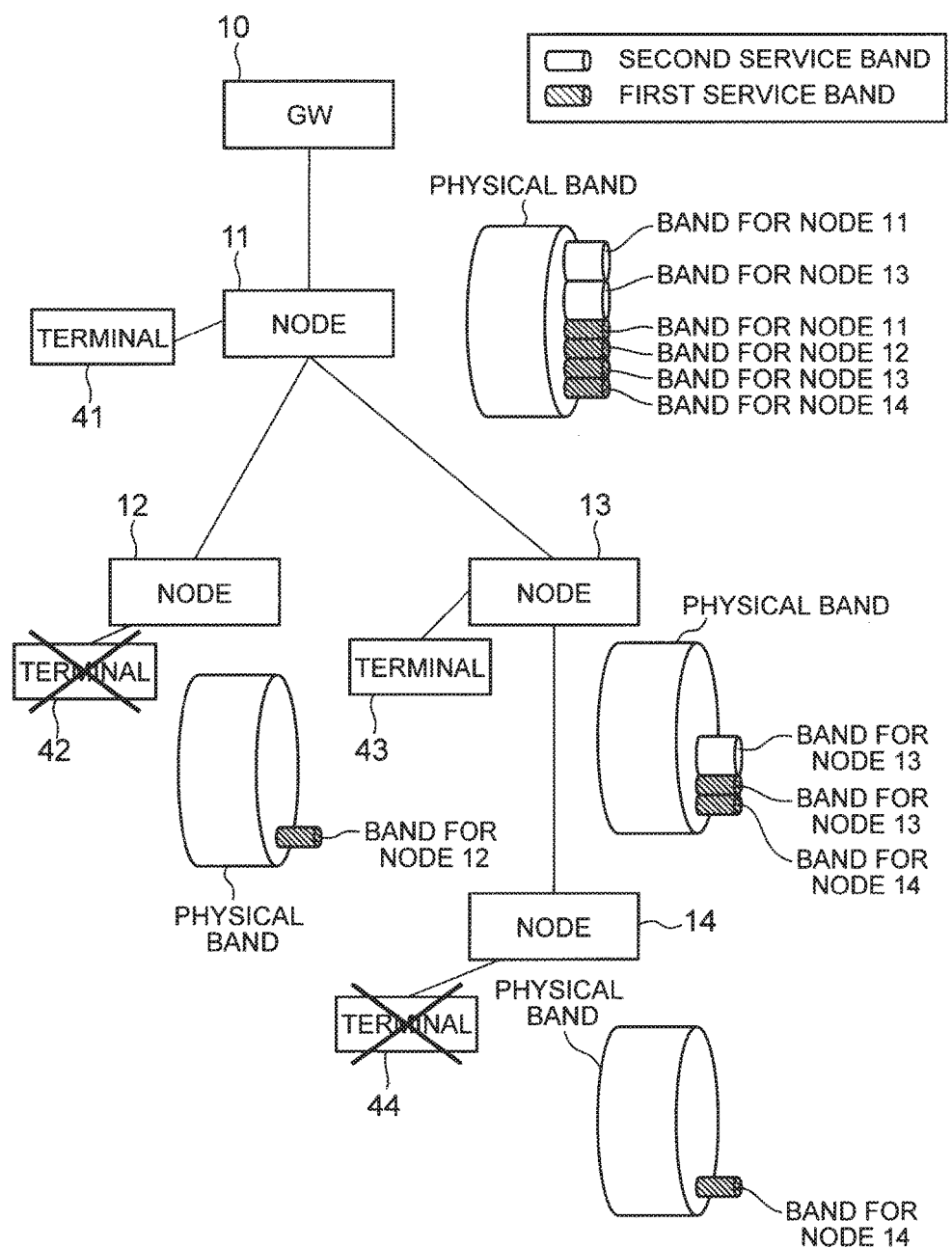
FIG. 4 It depicts an explanatory diagram illustrating a state of the network after performance of flow control based on recalculated bandwidth.

FIG. 4 is an explanatory diagram illustrating a state of the network after performance of flow control based on the recalculated bandwidth. After the recalculation, the GW 10 transmits, to each node, notification of one frame transmission time allocated and transmission timing in the frame. Each node performs communication based on the notification of transmission time and the transmission timing. As exemplified in FIG. 4, available second service bandwidth for the nodes 11 and 13 increases compared with that before the terminals 42 and 44 cannot be used.

Figure 5:
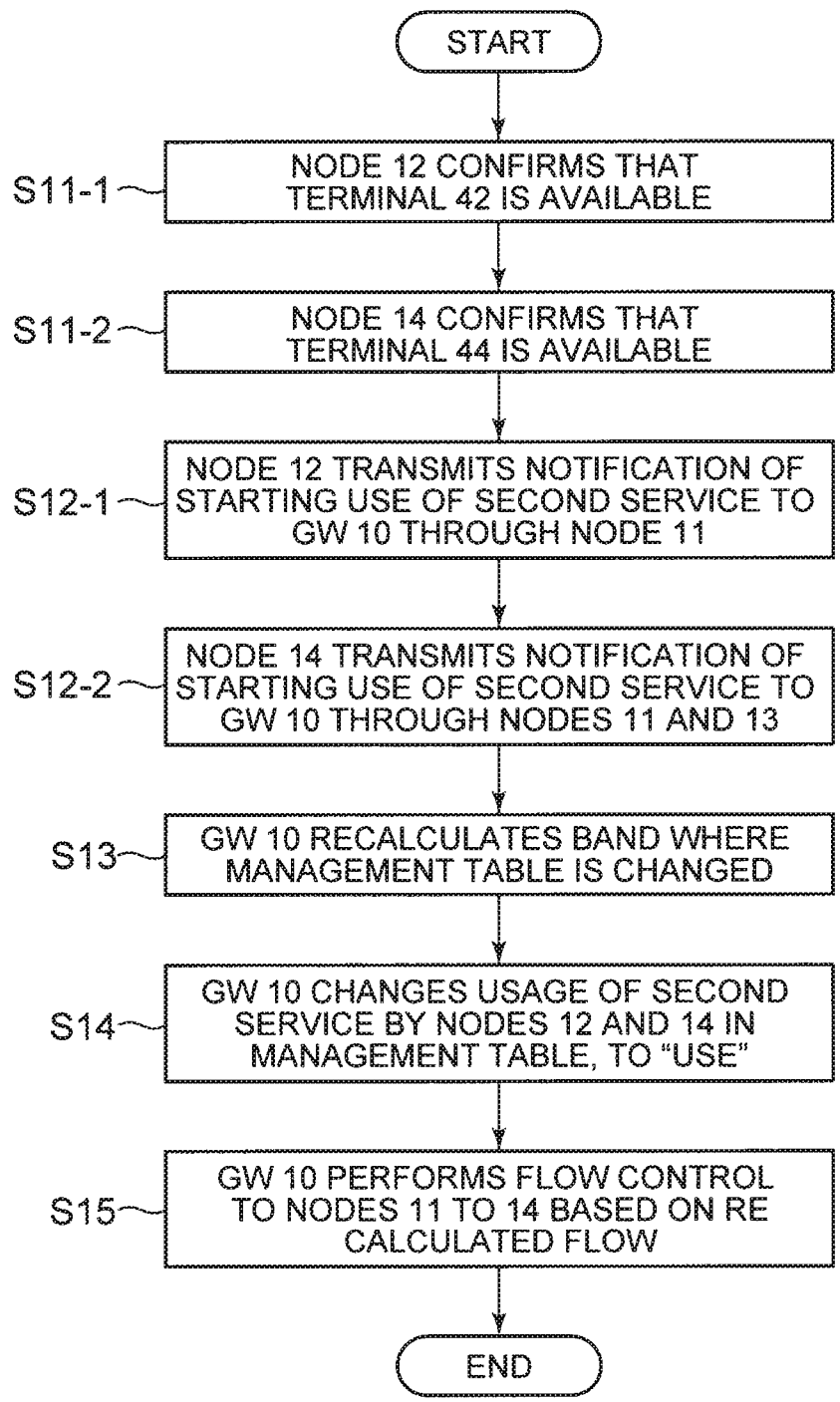
FIG. 5 It depicts a flowchart illustrating operation which is performed when the unused terminals can be available again.

Next, description will be made of operation which is performed when the terminals 42 and 44 can be available again due to turning on of the terminals or the like. FIG. 5 is a flowchart illustrating operation which is performed when the unused terminals can be available again.

The node 12 confirms that the terminal 42 is available (step S11-1). The node 14 confirms that the terminal 44 is available (step S11-2). Availability of a terminal is caused by for example, success in wireless communication between the terminal and a node which is caused by turning on of the terminal, recovery from device failure, or movement of the terminal or node. Note that, the order of steps S11-1 and S11-2 may be reversed.

Next, the node 12 transmits notification of starting use of the second service to the GW 10 through the node 11 (step S12-1). The node 14 transmits notification of starting use of the second service to the GW 10 through the nodes 11 and 13 (step S12-2).

Next, when receiving the notification of starting usage of the second service, from the nodes 12 and 14, the GW 10 recalculates the band where usage of the second service by the nodes 12 and 14 is changed to "USE" in the management table (step S13). Specifically, the GW 10 calculates formula (2) or (3), including the nodes 12 and 14, and determines whether use of the second service by the nodes 12 and 14 is allowed. When use of the second service by the nodes 12 and 14 is allowed, the GW 10 changes the participating number of nodes to a number including the nodes 12 and 14, and recalculates formula (4). Next, when the second service can be used by the nodes 12 and 14 as a result of calculation of formula (2) or (3), the GW 10 changes, to "USE", the usage of the second service by the nodes 12 and 14 in the management table (step S14). That is, the management table is returned from a state shown in Table 3 to a state shown in Table 1. Note that, after the usage of the second service by the nodes 12 and 14 in the management table is changed to "USE", the GW 10 may recalculate the band based on the changed management table.

The GW 10 performs flow control to the nodes 11 to 14 based on recalculated flow (step S15). Specifically, the GW 10 returns the second service bandwidths of the nodes 11 and 13 to the bandwidth before the terminals 42 and 44 cannot be used, according to a result of calculation, and then starts communication of the second service for the nodes 12 and 14. When the nodes 12 and 14 start communication of the second service, bandwidth of each of the nodes is returned to bandwidth illustrated in FIG. 1, that is, the bandwidth before the terminals 42 and 44 cannot be used. Note that, for example, owing to participation of a new node other than the nodes 11 to 14 in the network, the bandwidth of each node may not be returned to the bandwidth before separation of the nodes 12 and 14.

In the present exemplary embodiment, an example of updating the management table upon receiving, by the GW 10, the notification of non-use of the second service from the nodes has been described, but a system administrator may directly update the management table of the GW 10. For example, when the user cancels a contract for the second service, the system administrator changes the usage of the second service in the management table to "NON-USE".

When the additional service (second service) is not used in the network in which multihop communication is performed, the communication control system according to the present exemplary embodiment recalculates an unoccupied band to update the management table. Thus, the communication control system can effectively use the band dynamically, and increase user's convenience. Furthermore, when the additional service is available, the communication control system recalculates the unoccupied band to dynamically secure the band achieving fairness for the nodes participating in the network again and the already participating nodes.

Figure 6:
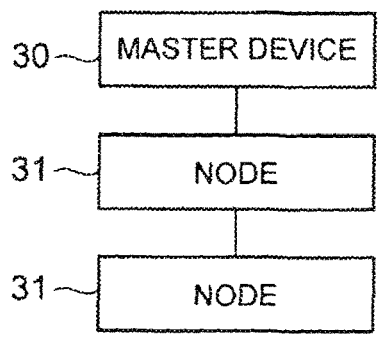
FIG. 6 It depicts a block diagram illustrating a configuration of a main portion of the communication control system according to the present invention.

Next, summary of the present invention will be described. FIG. 6 is a block diagram illustrating a configuration of a main portion of the communication control system according to the present invention. The communication control system according to the present invention includes, as a main configuration, a plurality of nodes 31, and a master device 30 for performing flow control of multihop communication in a network including the plurality of nodes 31. The master device 30 allocates, to each node 31 using the second service, a time obtained by subtracting, from a frame period of the network, a total one frame transmission time used for first service, as one frame transmission time used for second service having a priority set lower than that of the first service.

In addition, a node according to the following (1) to (5), and a communication control system according to (6) to (8) are also disclosed, in the above-mentioned exemplary embodiments.

(1) A node is included in a communication control system which comprises a plurality of nodes (e.g., nodes 11 to 14) and a master device (e.g., GW 10) for performing flow control of multihop communication in a network including the nodes. To the node in use of the second service, a time obtained by subtracting, from a frame period of the network, a total one frame transmission time used for first service is allocated, as a one frame transmission time used for second service having a priority set lower than that of the first service.

(2) The node may be configured so that when a terminal (e.g., terminals 41 to 44) connected to the node to be used for second service is not used, the node transmits, to the master device, notification of non-use of second service.

(3) The node may be configured so that when the node fails to receive a radio wave from the terminal connected to the node to be used for second service, the node determines that a second service is not used. According to such a node, an unused terminal is considered that second service is not used, and a band is effectively used automatically and dynamically.

(4) The node may be configured so that when the node requests participation in the network anew, whether to allow the participation is determined, based on the frame period, a one frame transmission time used for first service, and a guaranteed one frame transmission time used for second service. According to such a node, participation of a new node in a network does not interrupt communication of already participating nodes.

(5) The node may be configured so that a time allocated to second service is determined according to a predetermined contract. According to such a node, a node user can change a band used for additional service, if needed, and user's convenience is increased.

(6) A communication control system includes a plurality of nodes (e.g., nodes 11 to 14), and a master device (e.g., master device 10) for performing flow control of multihop communication in a network including the nodes. The master device allocates, to respective nodes using the second service, a time obtained by subtracting, from a frame period of the network, a total one frame transmission time of each node, used for first service, as a one frame transmission time used for second service having a priority set lower than that of the first service.

(7) The communication control system may be configured so that when a terminal (e.g., terminals 41 to 44) connected to a node is not used, the node transmits notification of non-use of second service to the master device.

(8) The communication control system may be configured so that when the node fails to receive a radio wave from the terminal connected to the node to be used for second service, the node determines that a second service is not used. According to such a communication control system, an unused terminal is considered that second service is not used, and a band is effectively used automatically and dynamically.

Figure 7:
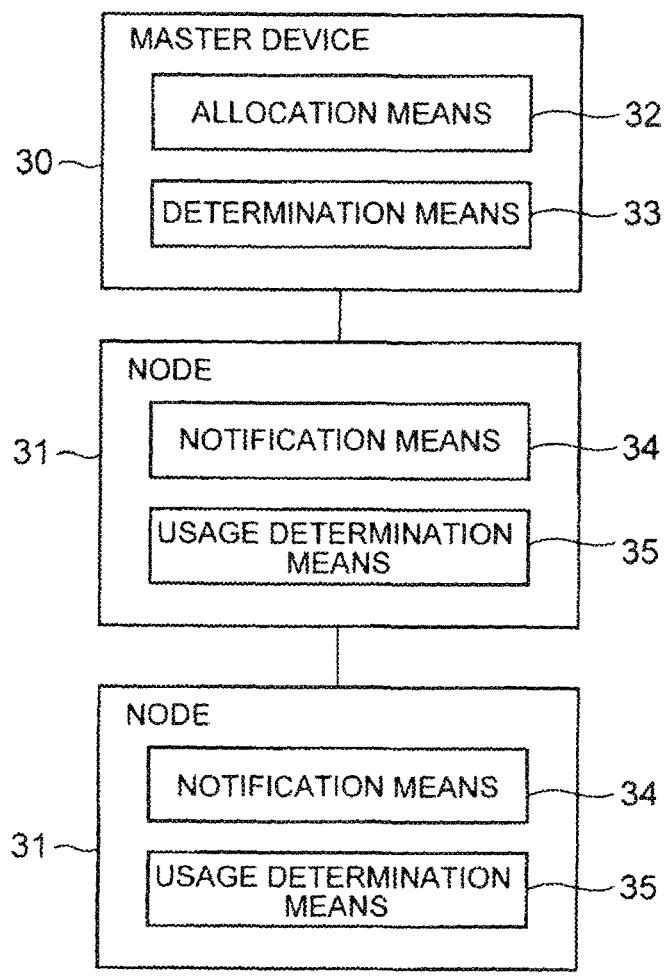
FIG. 7 It depicts a block diagram illustrating a specific configuration of the main portion of the communication control system according to the present invention.

Furthermore, the node according to the above-mentioned (1) to (5), and the communication control system according to (6) to (8) are also described as a node according to the following (1A) to (5A) and a communication control system according to (6A) to (8A). FIG. 7 is a block diagram illustrating a specific configuration of the main portion of the communication control system according to the present invention. The following node and communication control system have means which are respectively achieved by hardware designed to perform specific calculation processing or the like, or a computer operated according to a program. Furthermore, the program is stored in a non-transitory computer-readable storage medium.

(1A) A node is included in a communication control system which comprises a plurality of nodes (e.g., nodes 31 or nodes 11 to 14) and a master device (e.g., master device 30 or GW 10) for performing flow control of multihop communication in a network including the nodes. To the nodes in use of the second service, a time obtained by subtracting, from a frame period of the network, a total one frame transmission time used for first service is allocated, as a one frame transmission time used for second service having a priority set lower than that of the first service, by allocation means (e.g., allocation means 32).

(2A) The node may be configured to include notification means (e.g., notification means 34) for transmitting, to the master device, notification of non-use of second service, upon non-use of a terminal (e.g., terminals 41 to 44) connected to the node to be used for second service.

(3A) The node may be configured to include usage determination means (e.g., usage determination means 35) for determining non-use of second service, upon failing to receive a radio wave from a terminal connected to the node to be used for second service. According to such a node, an unused terminal is considered that second service is not used, and a band is effectively used automatically and dynamically.

(4A) The node may be configured so that when the node requests participation in the network anew, whether to allow the participation is determined, by determination means (e.g., determination means 33), based on the frame period, a one frame transmission time used for first service, and a guaranteed one frame transmission time used for second service. According to such a node, participation of a new node in a network does not interrupt communication of already participating nodes.

(5A) The node may be configured so that a time allocated to second service is determined by allocation means (e.g., allocation means 32), according to a predetermined contract. According to such a node, a node user can change a band used for additional service, if needed, and user's convenience is increased.

(6A) A communication control system includes a plurality of nodes (e.g., nodes 11 to 14), and a master device (e.g., master device 10) for performing flow control of multihop communication in a network including the nodes. The master device includes allocation means (e.g., allocation means 32) for allocating, to each nodes using the second service, a time obtained by subtracting, from a frame period of the network, a total one frame transmission time used for first service, as a one frame transmission time used for second service having a priority set lower than that of the first service.

(7A) The communication control system may be configured so that a node includes notification means (e.g., notification means 34) for transmitting notification of non-use of second service to the master device, upon non-use of a terminal (e.g., terminals 41 to 44) connected to the node.

(8A) The communication control system may be configured to include usage determination means (e.g., usage determination means 35) for determining non-use of second service, upon failing to receive a radio wave from the terminal connected to the node to be used for second service. According to such a communication control system, an unused terminal is considered that second service is not used, and a band is effectively used automatically and dynamically.

As described above, the present invention has been described with reference to the exemplary embodiments, but it should be understood that the present invention is not limited to the above-mentioned exemplary embodiments. Various changes and modifications which can be understood by a person skilled in the art may be made to the configurations and details of the present invention within the scope of the present invention.

The present application is based on and claims the benefit of priority from Japanese Patent Application No. 2014-95961 filed on May 7, 2014, the disclosure of which is incorporated herein in its entirety by reference.

REFERENCE SIGNS LIST

10 GW
11 to 14, 31 Node
30 Master device
32 Allocation means
33 Determination means
34 Notification means
35 Usage determination means
41 to 44 Terminal

The invention claimed is:

1. A master device for performing flow control of multihop communication in a network including a plurality of nodes, the master device being configured to:
    allocate, to each node using second service, a time obtained by subtracting, from a frame period of the network, a total one frame transmission time of each node, used for first service, as a one frame transmission time used for second service having a priority set lower than that of the first service; and
    determine whether to allow participation of a node requesting participation in the network anew, based on the frame period, a one frame transmission time used for first service, and a guaranteed one frame transmission time used for second service,
    wherein the master device is configured to allow participation of the node if the frame period>Σ(one frame transmission time used for first service per node)+Σ(guaranteed one frame transmission time used for second service per node) is satisfied.

2. The master device according to claim 1, wherein the master device determines a time allocated to second service, according to a predetermined contract.

3. A communication control system comprising:
    a plurality of nodes; and
    a master device for performing flow control of multihop communication in a network including the nodes, wherein the master device is configured to:
        allocate, to each node using second service, a time obtained by subtracting, from a frame period of the network, a total one frame transmission time of each node, used for first service, as a one frame transmission time used for second service having a priority set lower than that of the first service; and
        determine whether to allow participation of a node requesting participation in the network anew, based on the frame period, a one frame transmission time used for first service, and a guaranteed one frame transmission time used for second service,
        wherein the master device is configured to allow participation of the node if the frame period>Σ(one frame transmission time used for first service per node)+Σ(guaranteed one frame transmission time used for second service per node) is satisfied.

4. The communication control system according to claim 3, wherein
    when a terminal connected to a node to be used for second service is not used, the node transmits, to the master device, notification of non-use of the second service.

5. The communication control system according to claim 4, wherein
    when the node fails to receive a radio wave from the terminal connected to the node to be used for second service, the node determines that the second service is not used.

6. A communication control method used for a plurality of nodes, and a master device for performing flow control of multihop communication in a network including the nodes, the method comprising: causing the master device to
    allocate, to each node using second service, a time obtained by subtracting, from a frame period of the network, a total one frame transmission time of each node, used for first service, as a one frame transmission time used for second service having a priority set lower than that of the first service; and
    determine whether to allow participation of a node requesting participation in the network anew, based on the frame period, a one frame transmission time used for first service, and a guaranteed one frame transmission time used for second service,
    wherein the master device is configured to allow participation of the node if the frame period>Σ(one frame transmission time used for first service per node)+Σ (guaranteed one frame transmission time used for second service per node) is satisfied.

7. The communication control method according to claim 6, wherein
    when a terminal connected to a node to be used for second service is not used, the node transmits, to the master device, notification of non-use of the second service.

8. The communication control method according to claim 7, wherein
    when the node fails to receive a radio wave from the terminal connected to the node to be used for second service, the node determines that the second service is not used.

9. The communication control method according to claim 6, wherein the master device determines a time allocated to second service, according to a predetermined contract.

10. A non-transitory computer readable recording medium in which a communication control program is recorded, the communication control program is installed in a computer for performing flow control of multihop communication in a network including a plurality of nodes, the communication control program causing a computer to:
- allocate, to each node using second service, of a time obtained by subtracting, from a frame period of the network, a total one frame transmission time of each node, used for first service, as a one frame transmission time used for second service having a priority set lower than that of the first service; and
- determine whether to allow participation of a node requesting participation in the network anew, based on the frame period, a one frame transmission time used for first service, and a guaranteed one frame transmission time used for second service,
- wherein the communication control program causes the computer to allow participation of the node if the frame period>Σ(one frame transmission time used for first service per node)+Σ(guaranteed one frame transmission time used for second service per node) is satisfied.

11. The non-transitory computer readable recording medium in which the communication control program is recorded according to claim 10,
- wherein the communication control program causes the computer to determine a time allocated to second service, according to a predetermine contract.

* * * * *